United States Patent [19]

Atkinson et al.

[11] Patent Number: 5,106,104
[45] Date of Patent: Apr. 21, 1992

[54] CONSTANT PRESSURE DROP MULTIPLE STAGE BRUSH SEAL

[75] Inventors: Edward Atkinson, Morrow; Brent L. Bristol, Milford, both of Ohio

[73] Assignee: General Electric Company, Cincinnati, Ohio

[21] Appl. No.: 596,147

[22] Filed: Oct. 11, 1990

[51] Int. Cl.$^5$ .......................................... F16J 15/447
[52] U.S. Cl. .......................................... 277/1; 277/53; 415/174.5
[58] Field of Search .......................... 277/1, 3, 53–57, 277/58; 415/173.5, 174.5

[56] References Cited

U.S. PATENT DOCUMENTS

| | | |
|---|---|---|
| 885,032 | 4/1908 | De Ferranti . |
| 1,626,237 | 7/1921 | Hodgkinson . |
| 2,018,372 | 10/1935 | Mason .......................... 277/53 X |
| 4,202,554 | 5/1980 | Shell . |
| 4,756,536 | 7/1988 | Belcher . |

FOREIGN PATENT DOCUMENTS

| | | | |
|---|---|---|---|
| 46265 | 3/1983 | Japan .................................... | 277/53 |
| 714089 | 2/1980 | U.S.S.R. ................................ | 277/53 |
| 1598926 | 9/1981 | United Kingdom .................. | 277/53 |

Primary Examiner—William A. Cuchlinski, Jr.
Assistant Examiner—Scott W. Cummings
Attorney, Agent, or Firm—Jerome C. Squillaro

[57] ABSTRACT

A multiple stage brush seal having a controlled distribution of pressure drops across each stage of the seal is provided. The pressure drop across each stage is controlled by one or a combination of the following structural arrangements: increased clearance gaps, reduced bristle packing, and venting holes in the seal stage backing plate.

35 Claims, 5 Drawing Sheets

CONSTANT PRESSURE DROP MULTIPLE STAGE BRUSH SEAL

The present invention relates generally to seals having a plurality of pressure drop stages and in particular to such seals useful on a gas turbine engine.

BACKGROUND OF THE INVENTION

Gas turbine engines, particularly those used to propel aircraft, are subject to non-uniform heating and cooling during transient operating conditions. Such conditions occur, for example, during aircraft takeoffs and landings. During an engine transient, various engine parts and structures experience differential thermal growth rates; in other words, they expand and contract at different rates. Thus, when an engine is throttled back, during an approach for a landing, for example, the engine casing, which is a thin metallic structure, will typically cool faster than the inner, more massive, rotating engine parts. The casing will contract inwardly and thereby create a potential for rubbing contact between various static and moving engine parts.

Rubbing contact between engine parts is generally undesirable for at least two reasons. First, the engine parts can be damaged, which can result in replacement costs. Second, the rubbing creates gaps between engine parts that allow an unwanted efficiency wasting flow of gas to occur between the engine parts. To inhibit engine damaging rubbing between parts, engines are designed with clearance gaps of a predetermined size between stationary and moving engine components. These clearance gaps would allow air or gas to flow from one portion of the engine to the other, resulting in a loss of engine efficiency as just described, unless appropriate seals are used to restrict such flows.

In a typical gas turbine engine, labyrinth seals are disposed between rotating and stationary members to restrict the flow of air or gas between upstream high pressure regions and downstream low pressure regions of the engine. A labyrinth seal usually consists of one or more pointed hardened seal teeth disposed on a rotating, substantially cylindrical, member and running in close proximity to a cylindrical or stepped cylindrical stator or stationary member typically carried in some manner by the engine casing. The seal teeth act to restrict the flow of air or gas between the two members from the upstream to the downstream region. On some gas turbine engine applications, particularly inter-shaft seals, the cylindrical "stator" just referred to also rotates independently of the toothed seal member. A labyrinth seal restricts the air flow one or more times depending upon the number of teeth used between the two seal members. The total pressure drop across the seal is the sum of the individual pressure drops experienced across each tooth of the seal.

While labyrinth seals generally perform well when new, they are subject to a loss of efficiency over time because of the rubbing contact referred to above. More specifically, during an engine transient of the type where the engine slows, the engine casing, which has a lower thermal capacity, is subject to thermal contraction due to cooling at a quicker rate than the rotor portion, which has a higher thermal capacity relative to the engine casing, carrying the seal teeth. As the casing carrying the stationary seal member contracts, the individual seal teeth tend to dig into the seal lining mounted on the seal land, i.e., the seal member mounted on the stator member of the seal. This may create grooves in the seal and lining and when the engine is again operated at cruise or accelerated conditions, that is, when the engine casing has expanded to operational size, a gap may now be present between the teeth and the lining that allows additional, unwanted air flow through the seal.

Over several thousand hours of operation a labyrinth seal will become progressively less able to accomplish its sealing function effectively. To be effective over the long term, clearance control between the rotating and stationary labyrinth seal members during engine transients is of critical importance and needs improvement. While such clearance control is theoretically possible, the weight and cost of the apparatus necessary to achieve the control make it impractical. It would be desirable, therefore, to provide a seal more tolerant of thermal transient conditions and less subject to efficiency losses.

One type of seal that meets the just mentioned criteria is a brush seal. A brush seal typically consists of a plurality of bristles disposed between a facing plate and a backing plate. The seal is most often attached to a stationary seal member, and the ends of the bristles, which project beyond the backing plate, make contact with a rotating seal member. Because the bristles can flex whereas the hardened seal teeth of the labyrinth seal cannot, a brush seal is more tolerant of changes in the size of the engine dimensions during engine transients. That is, in an application such as a gas turbine engine, when the engine casing contracts more quickly than the rotating parts, thus narrowing the clearance gap between them, the bristles can "take up" the reduced gap size by flexing radially whereas labyrinth seal teeth would gouge the lining.

The effectiveness of brush seals are, however, limited in other ways. For example, the very bristle pliancy that enables them to tolerate thermal excursions better than a labyrinth seal limits the pressure drop that the seal can tolerate. Thus, where the pressure drop across a seal is too great for a single set of bristles to handle, multiple stages are used. It is known, however, that the pressure drop across each stage increases from stage to stage from the high pressure region to the low pressure region. Even though multiple stages of bristles are used in the seal, it is still possible that the pressure drop across the last stage of the seal will exceed the capabilities of that stage, and that the end result may be seal failure.

One apparatus for addressing this problem is shown in U.S. Pat. No. 4,756,536 to Belcher. In this particular application of a brush seal it is proposed to decrease the pressure drop across the final stage of the seal by diverting air from the high pressure side of the final stage into a third pressure region and in some applications, from the third pressure region into the downstream side of the seal. This is accomplished through the use of an apertured spacer ring disposed upstream of the seal stage facing plate. Air or gas passes through the spacer ring apertures and then vents through a plurality of apertures located in the static structure to which the seal stages are attached. While perhaps serving to accomplish the goal of reducing the pressure drop across the final stage, this particular method requires an engine geometry that allows air to be bypassed into a third pressure area of the engine. This design may make the engine heavier and, due to the machining costs of machining apertures in the spacing ring and in the static engine structure, is sure to increase the cost of the engine. In addition, placement of the apertures in the static structure is sure to entail additional manufacturing problems. Finally, a further disadvantage of this particular method is that the apertures are subject to blockage. If the apertures become blocked they will not vent properly and, as a result, the final stage may fail because the pressure drop will increase across that stage to a level that may exceed its capabilities.

OBJECTS OF THE PRESENT INVENTION

It is a principle object of the present invention to provide new and improved apparatus that is not subject to the foregoing disadvantages.

It is another object of the present invention to provide a brush seal having a plurality of stages wherein the pressure drop across each stage is substantially equal to reduce the potential for seal failure.

It is a further object of the present invention to provide a gas turbine engine having at least one multiple stage brush seal having a substantially equal pressure drop across each stage.

SUMMARY OF THE PRESENT INVENTION

According to the present invention, there is provided a multiple stage brush seal having a plurality of pressure reduction stations wherein a substantially equal pressure drop is maintained across each stage of the seal by increasing the effective flow area of each stage of the seal from the high pressure side of the seal to the low pressure side of the seal. The effective flow area of the seal stages can be increased by increasing the clearance gap between the seal members, by decreasing the density or thickness of the bristle packing, by increasing bristle diameter, by placement of a plurality of venting holes or apertures in the backing plate of each seal stage, or by some combination of these five methods.

The foregoing objects of the invention as well as others will become apparent to those skilled in the art when the following detailed description is read in conjunction with the accompanying drawings and claims. Throughout the drawings, like numerals refer to similar or identical parts.

DETAILED DESCRIPTION OF THE PRESENT INVENTION

Figure 1:
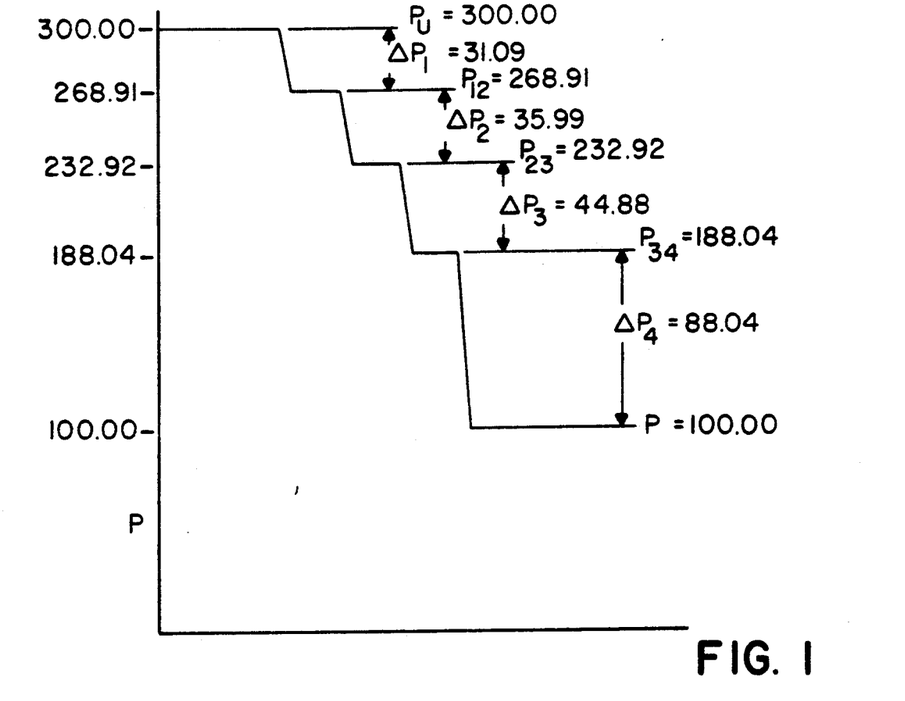
FIG. 1 is a chart depicting the typical pressure drop across the individual stages of a prior art brush seal.

FIG. 1 illustrates an expected total pressure drop across a prior art brush seal as well as the individual pressure drop across each seal stage wherein, for example, an upstream high pressure area $P_u$ is at 300 pounds per square inch (psi) and a downstream low pressure region $P_d$ is at 100 psi. The pressure drop across any stage of the seal is generally given by $$\Delta P_n = P_{n-1,n} = P_{n,n+1},$$

where
$\Delta P_n$ = the pressure drop across stage n of the seal;
$P_{n-1,n}$ = the pressure between stage n−1 and n; and
$P_{n,n+1}$ = the pressure between stage n and n+1.
Thus, the pressure drop across stage 1 is given by $$\Delta P_1 = P - P_{12} = 300 - 268.91 = 31.09 \text{ psi}.$$

Similarly, the pressure drop across stage two is 35.99 psi, the pressure drop across stage three is 44.88 psi, and the pressure drop across the final stage is 88.04 psi. As is easily seen, the pressure drop increases from stage to stage in an upstream to downstream direction, that is, in the direction of the gas or air flow. In such a circumstance, the pressure drop across the last seal stage, here stage four, may be more than the seal stage can resist without causing permanent damage to the bristles in that seal stage. Should a downstream stage fail, the pressure drops across the upstream stages will increase and may lead to a domino failure of seal stages and total failure of the seal itself.

Figure 2:
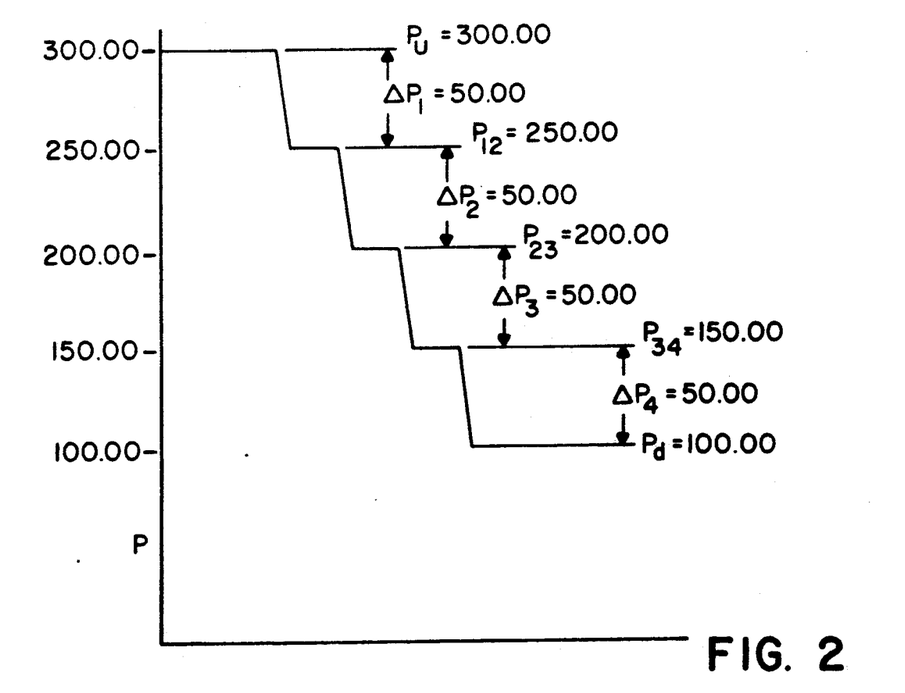
FIG. 2 is a chart that illustrates a desirable pressure drop across the individual stages of a brush seal in accordance with the present invention.

In contrast, FIG. 2 shows a desirable pressure drop across a four stage brush seal wherein, for example, the initial upstream pressure is 300 psi, the downstream pressure is at 100 psi and the pressure drop across each stage is equal to 50 psi. As illustrated in the figure, the pressure drop across each stage is equal and therefore each stage acts equally to seal the upstream region from the downstream region. By substantially equalizing the pressure drop across the seal stages, seal failure is less likely to occur. In this sense, and throughout the specification, "substantially equal" means that the pressure drop across each stage of a multi-stage seal is within about ±10 percent of the theoretical average pressure drop across each stage of the seal. The desired staged pressure drop shown in FIG. 2 is obtained with a structure in accordance with the present invention, as will be explained below.

Figure 3:
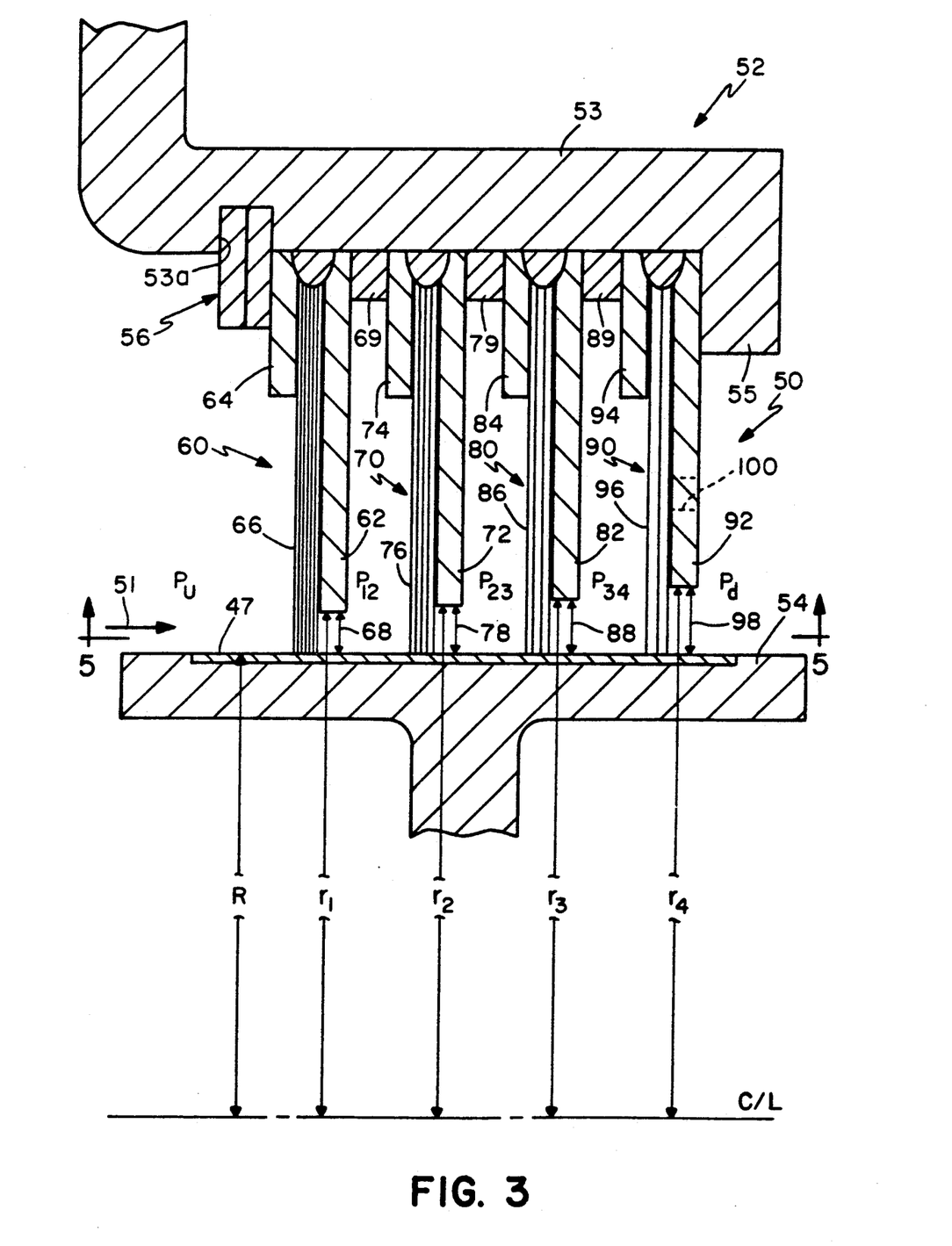
FIG. 3 illustrates in a cross sectional, elevation view a brush seal in accordance with the present invention.

FIG. 3 depicts in a cross section a brush seal 50 in accordance with the present invention disposed between a seal member 53 and a seal member 54. Seal members 53 and 54 may be both stationary, both rotating, or one may be stationary and one rotating, depending upon the desired application. For purposes of illustration only, brush seal 50 will be described as being disposed between a stationary member 53 and a rotating member 54.

As shown in FIG. 3, brush seal 50 comprises multiple stages, a first stage 60, a second stage 70, a third stage 80, and a fourth stage 90. While the particular embodiment shown here has four stages, it should be recognized that the invention is equally applicable to a seal having two, three, five or more stages. The brush seal 50 acts to block a flow of an air or gas stream generally indicated by an arrow 51 and divides an upstream high pressure area, $P_u$ from a downstream low pressure area, $P_d$. Additionally, the individual stages of seal 50 create differing pressure regions. Thus first stage 60 divides pressure area $P_u$ from pressure area $P_{12}$; second stage 70 divides pressure area $P_{12}$ from pressure area $P_{23}$; third stage 80 divides pressure area $P_{23}$ from pressure area P34; and fourth stage 90 divides pressure area P34 from pressure area Pd.

Brush seal 50 is contained within a housing 52 defined in part by stationary member 53 and a depending member 55 attached to the stationary member 53. A retaining means 56 is disposed within a cavity 53a of member 53 and functions to removably retain brush seal 50 in its proper location. Brush seal 50 may be fixedly attached to member 53 if desired, but such an attachment may make replacement of the seal difficult. The firmly attached design will be lighter and cheaper and may be preferred in some applications.

Each stage of seal 50 includes a facing plate and a backing plate with a plurality of bristles disposed therebetween. Thus first, second, third, and fourth stages 60, 70, 80, and 90 each include a backing plate 62, 72, 82, and 92, a facing plate 64, 74, 84, and 94, and a plurality of bristles 66, 76, 86, and 96, disposed therebetween, respectively. First stage 60 is separated from second stage 70 by a spacer 69; second stage 70 is separated from third stage 80 by a spacer 79; and third stage 80 is separated from fourth stage 90 by a spacer 89. Depending upon the particular application, the dimensions and materials of these structures will vary. In a representative application in a gas turbine engine, e.g., the plates may be made of a nickel alloy and the bristles may be made of cobalt alloy.

Backing plates 62, 72, 82 and 92 are spaced apart from a sealing surface 47 of rotating member 54 by a clearance gap 68, 78, 88, and 98 respectively. The ends of bristles 66, 76, 86, and 96 extend beyond the reach of backing plates 62, 72, 82, and 92 and across clearance gaps 68, 78, 88, and 98 respectively, to contact sealing surface 47.

The pressure drop across a particular seal stage is dependent upon the effective flow area of that stage, which is defined in part by the clearance gap and the density of the packing of the bristles. In other words, the pressure drop across any particular stage is related in part to the area through which the air or gas stream must pass to get from one region of pressure to another as well as the length of the flow path the stream must traverse to get from one pressure region to another. As such, the pressure drop across a particular seal stage can be tailored to a desired amount by selectively varying the effective flow area of the seal stage. By way of a general example, by selectively increasing the effective flow area from stage to stage, the pressure drop across a downstream stage can be made substantially equal to an adjacent upstream stage. To equalize the pressure drop across the entire seal, then, such that the individual pressure drop across each stage is substantially equal, the effective flow area can be increased from seal stage to seal stage in a predetermined manner.

The effective flow area of a seal stage can be affected in several ways. For example, this can be done by either changing the radial clearance gap in successive stages, changing the density or thickness of the bristle packing in successive stages, by varying bristle diameter, by adding apertures to a backing plate to allow more air to pass through that particular seal stage, or by various combinations of the means just mentioned.

Under normal circumstances, the only path for air or gases to travel from one pressure area to another is through the clearance gap between the backing plates and the sealing surface. Again, by way of example, and as will be made clear below, for a gas turbine engine where the structures have a substantially circular cross sectional configuration, the total area of this clearance gap is annularly shaped and is given by the formula $$\text{Gap Area} = \pi(r_n^2 - R^2)$$

where $r_n$ is equal to the distance between the center line of the engine and the backing plate of seal stage n and R is equal to the distance from the centerline 5 of the engine to the sealing surface 47 confronted by the bristles. Increasing the clearance gap increases the area through which air or gas may flow and thus results in an increased effective flow area.

The effective flow area is also affected by the density of the packing of the bristles as previously mentioned. The bristle ends that extend into the clearance gap area and contact the hardened sealing surface area 47 create a torturous flow path for any air or gas that tries to move from an upstream high pressure area to a downstream low pressure area. Thus, by selectively changing the density or thickness of the packing of the bristles or by varying the bristle diameter from stage to stage, the effective flow area can also be selectively varied. That is, increasing the packing density results in an increased restriction to the flow because the air or gas has additional obstacles—the bristles—to travel around even though the straight line distance may not have changed. Because the path length increases so does the time it takes to traverse the seal stage. The net result is a decrease in the effective flow area. Conversely, decreasing the bristle packing results in an increase in the effective flow area for reasons analogous to those given above. Decreasing the thickness or width of the bristle packing also affects the travel time of the air or gas molecules because doing so produces a shorter obstructed flow path and thus results in an increased effective flow area. Similarly, increasing the bristle diameter results in an increased effective flow area because the air or gas has generally fewer obstacles to traverse.

Another way to affect the effective flow area and to control thereby the pressure drop across a stage is similar to increasing the clearance gap. Thus, a backing plate may have a plurality of flow through holes of a predetermined size added thereto. These holes can be selectively sized and in such number that a predetermined total flow-through-area can be created. As the total flow-through-area increases, so does the effective flow area of the stage and the pressure drop across the stage.

Three of these manners of changing the effective flow area of a seal stage are illustrated in FIG. 3. First, as can be seen from FIG. 3, the clearance gap increases in successive stages as one progresses from the first through the fourth stages of the seal 50. That is, clearance gap 68 is smaller than clearance gap 78. In turn clearance gap 78 is smaller than clearance gap 88 and so on. Thus, by increasing the clearance gap from stage to stage, the effective flow area can be changed in a desired manner and the pressure drop across the stage changed accordingly. The gaps shown in FIG. 3 are illustrative only and are not intended to indicate a preferred rate of gap increase. For an application such as a gas turbine engine, the gaps shown in FIG. 3 are greatly exaggerated in size since such gaps would commonly be only about 0.05 to 0.1 inches.

In addition to depicting the use of an increasing clearance gap, to control the effective area of successive stages of brush seal 50, FIG. 3 also illustrates a changing density in the bristle pack of successive stages of the seal. That is, the density of the lines illustrating the bristles generally indicates the relative density of the packing between stages. Bristles 66 are more densely packed than bristles 76 as indicated by the additional lines illustrating bristles 66. Similarly, bristles 76 are more densely packed than either bristles 86 or 96. It should be noted that the number of lines depicting the bristles in each stage is illustrative only and is not intended to indicate a preferred ratio of packing density.

Figure 4:
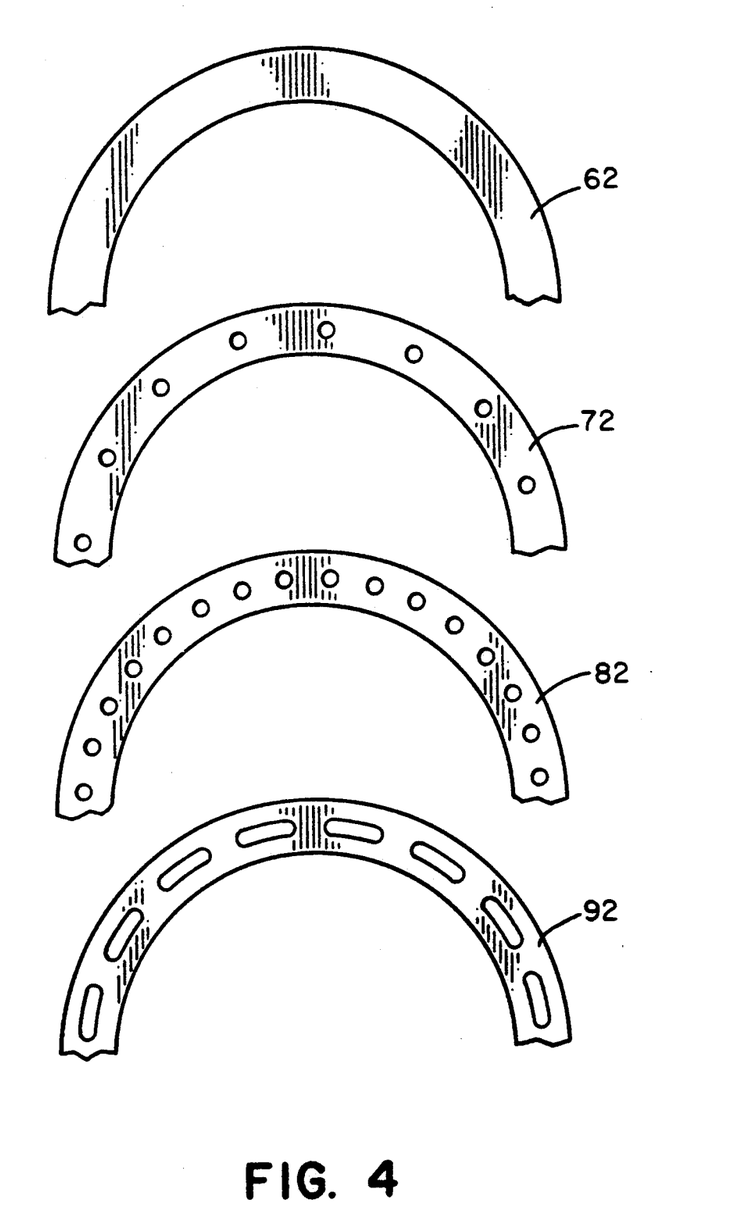
FIG. 4 illustrates in a partial view the backing plates of a four stage brush seal in accordance with the present invention.

FIG. 3 also depicts the addition of venting holes or apertures to the backing plate so as to increase the effective flow area of the seal stages. Such venting holes are generally indicated by a hole 100 in backing plate 98 of fourth seal stage 90. An illustrative array of such holes is shown in greater detail in FIG. 4. Thus, as shown in FIG. 4, stage 2 has a plurality of venting holes of a certain preselected size and orientation providing an additional area for air to pass from one side of a seal stage to the other. Stage 3, as shown in FIG. 4, includes flow through holes of generally the same configuration of FIG. 2 but of a greater number, thereby increasing the effective flow area of that stage of the seal. FIG. 4 shows another configuration of further venting holes by the addition of elongated slots disposed in the fourth stage backing plate. While circular holes are shown in stages 2 and 3 of FIG. 4, and elongated holes are shown in stage 4, the present invention may utilize a variety of holes having other cross-sectional configurations, number, or placement of such holes. Such holes could be of any desired shape and orientation such that the effective flow area increased from stage to stage in a desired manner due to the increasing total flow through area created by the presence of the holes.

Figure 5:
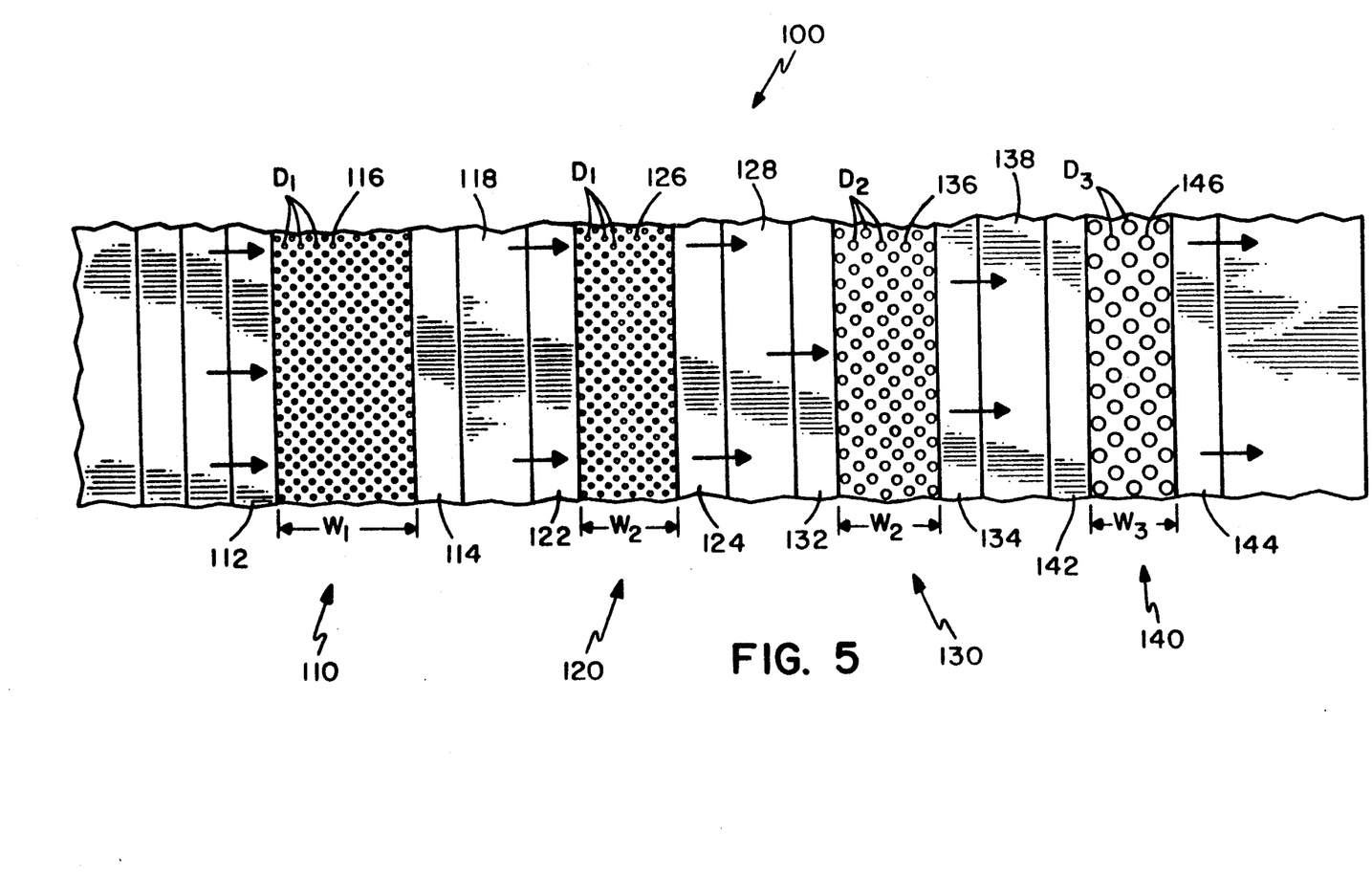
FIG. 5 illustrates a view of a four stage brush seal similar to the seal shown in FIG. 3 along cutting plane 5—5 thereof showing a variation in bristle packing thickness and bristle diameter.

Referring now to FIG. 5, a four stage seal similar, but not identical, in construction to the seal shown in FIG. 3 is illustrated taken along cutting plane 5—5 of the latter Figure. FIG. 5 depicts changing the effective flow area of a seal by variably changing the thickness or width of the bristle packing across the seal 100 or by variably changing the diameter of the bristles in a stage across the seal. Thus, there is illustrated in the Figure, a four stage seal including first, second, third and fourth stages 110, 120, 130, and 140 respectively. First, second, third and fourth stages each include a facing plate 112, 122, 132, and 142 respectively, and a backing plate 114, 124, 134 and 144 respectively, sandwiching a plurality of bristles 116, 126, 136, and 146 respectively. Additionally, a spacer 118, separates first stage 110 from second stage 120, a spacer 128 separates second 120 from third stage 130, and a spacer 138 separates third stage 130 from fourth stage 140.

Bristle pack 116 has a width or thickness $W_1$ and includes a plurality of bristles each having substantially the same diameter $D_1$. Bristle pack 126 of stage 120 has a reduced width $W_2$ wherein $W_1 > W_2$ but wherein the diameter of the bristles in bristle pack 126 remains substantially equal to the diameter of the bristles in bristle pack 116. Thus, by reducing the width of the bristle pack from stage 1 to stage 2, the obstructed path length that the air or gas molecules must traverse from one side of the seal to the other is diminished, thereby increasing the effective flow area of stage 2.

Third stage 130 has a bristle packing 136 substantially equal in width to that of bristle packing 126. The individual bristles forming bristle packing 136, however, have a diameter $D_2$ larger than the diameter $D_1$ of the bristles found in bristle packing 116 and 126. Thus the transition from stage 2 to stage 3 illustrates another structural change that can be made to the brush seal 100 to increase the effective flow area from stage to stage. By increasing the bristle diameter while retaining the same width of packing, the air and gas molecules have fewer obstacles to move around and thus are able to move from the upstream side of seal 130 to the downstream side thereof more easily, thus resulting in an increase in the effective flow area across the seal in relation to stages 110 and 120.

Fourth stage 140 includes a bristle pack 146 wherein both the width of the bristle packing and the diameter of the individual bristles is increased over that of the upstream stages. Thus, the individual bristles forming bristle pack 146 have a substantially equal diameter $D_3$ which is greater than $D_2$ and $D_1$. Additionally, bristle pack 146 has a width $W_3$ less than $W_2$ and $W_1$. Thus, the transition from stage 3 to stage 4 illustrates affecting the effective flow area by both increasing the bristle diameter and decreasing the width of the packing. As shown in the Figure then, the structural arrangement of the brush seal can be selectively modified to effect desired increases in the effective flow area from seal stage to seal stage proceeding from the upstream to the downstream direction in order to selectively change the pressure drop across each individual seal stage. As previously noted, the structural changes can be made so as to make each pressure drop across each stage of the seal substantially equal to each other.

While FIGS. 3, 4 and 5 illustrate the structural arrangements described for controlling the effective flow area and resulting pressure drop across each brush seal stage it should be understood that these arrangements may be used individually or in combination with one another to form a composite seal having multiple stages. Thus, the present invention contemplates a seal where the effective flow area of one or more downstream stages of a multiple stage brush seal is increased by increasing the clearance gap, by decreasing the bristle packing density, by increasing the bristle diameter, by decreasing the width of the bristle packing, or by adding flow through holes to a backing plate. In addition, the present invention contemplates increasing the effective flow area of at least one downstream seal stage of a multiple stage brush seal by using in combination two or more of the five structural arrangements just discussed, such as by increasing the clearance gap and decreasing the bristle packing width; increasing the bristle diameter and adding flow through holes; or decreasing bristle packing density and adding flow through holes to a backing plate. The present invention further contemplates using all five structural arrangements in different combinations on different stages of a multiple stage brush seal. By way of example only, one downstream seal stage may utilize an increased clearance gap, another stage may utilize a reduced bristle packing density and flow through holes in the backing plate, a third may utilize an increased clearance gap and an increased bristle diameter, while a fourth may utilize flow through holes, a reduced packing width and increased bristle diameter.

Figures 6A, 6B:
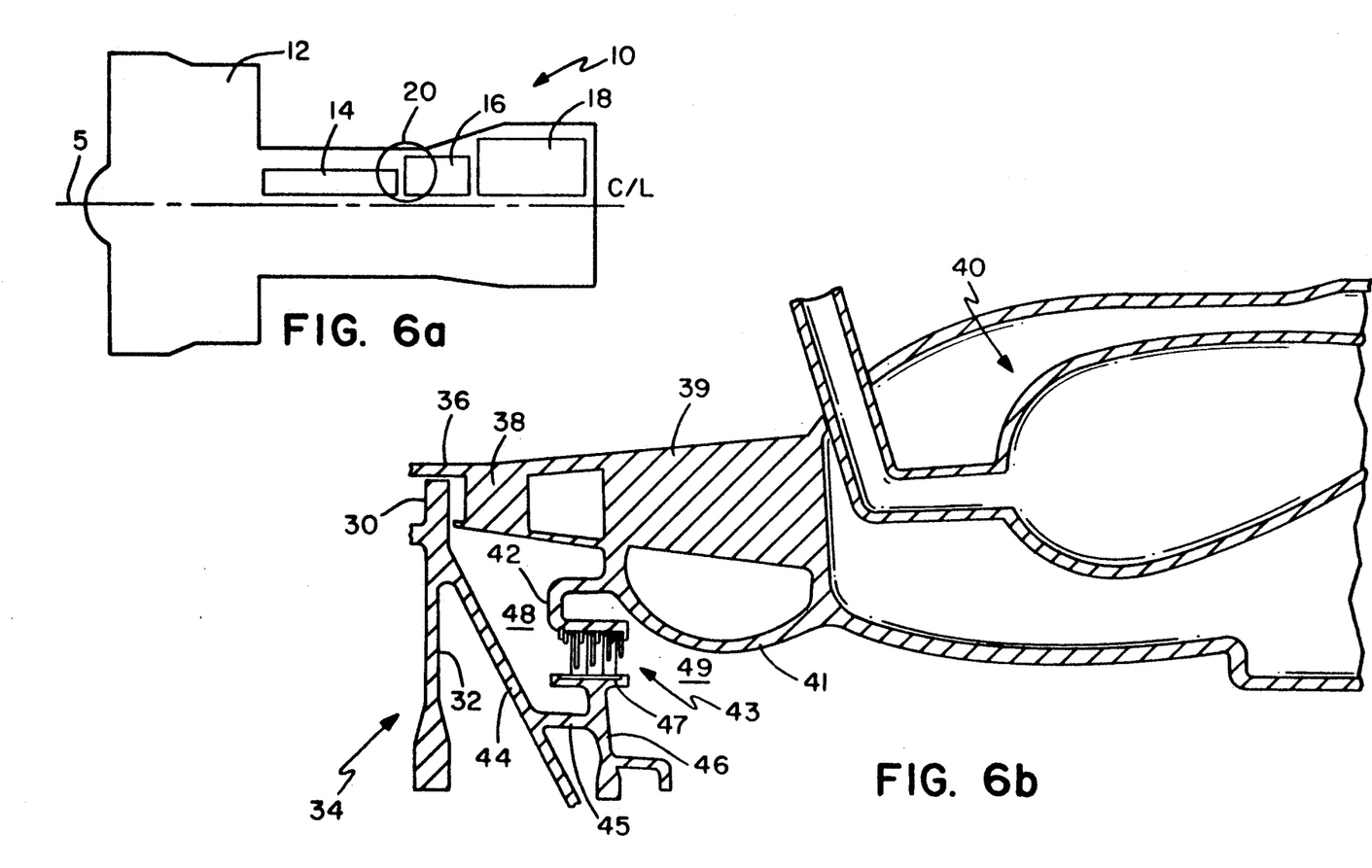
FIGS. 6a and 6b schematically show a gas turbine engine and a typical application of a brush seal in accordance with the present invention.

FIGS. 6a and 6b illustrate a gas turbine engine and a proposed application thereon in accordance with the present invention, respectively. Thus in FIG. 6a, a gas turbine engine 10 is shown in a highly schematic form and includes a fan section 12, a compressor section 14, a combustion section 16 and a turbine section 18 arranged in an axial flow relationship. Atmospheric gases enter fan section 12 where a portion of the airflow is passed on to compressor 14. The compressor section delivers a highly compressed gas stream to the combustion section 16 where the gas stream is mixed with fuel and is ignited to produce a high temperature, fast moving, exhaust gas stream. Turbine section 18 extracts energy from the exhaust gas stream and through a shaft (not shown) provides power to the compressor and fan sections.

FIG. 6b, which is a somewhat more detailed cross sectional view of area 20 of FIG. 6a, shows in cross section one application for a brush seal 43 for the present invention. Thus, as shown there, compressor rotor blade 30 is attached to a rotor disk 32 forming part of the last stage of rotor 34. Blade 30 is spaced from an outer compressor casing 36. Attached to compressor casing 36 is a stator 38 and an outlet guide vane 39 that efficiently steers the compressed gas stream into combustor 40 where it is mixed with fuel and ignited.

Depending from outlet guide vane 39 is a crescent configured toroid 41 to which a U-shaped member 42 is attached. A seal 43 embodying the invention is attached to U-shaped member 42. Depending from compressor disk 32 of the engine 10 is a conical section 44. Attached to the cone section 44 by an arm 45 is a disk structure 46 which carries hardened annular sealing surface 47. The ends of the bristles of the brush seal 43 contact sealing surface 47, thereby effectively sealing a high pressure region 48 of engine 10 from a low pressure region 49. In this embodiment of the present invention, each of the seal stage backing plates such as backing plates 62, 72, 82, 92 of FIG. 3 and each of the seal stage facing plates such as facing plates 64, 74, 84, 94 of FIG. 3 have a substantially annular structure. The bristles disposed therebetween form an annular array. Similarly, any seal stage spacers not shown in FIG. 3 as well as stationary member 54 and rotating member 56, would all display an annular configuration. In an application such as shown in FIG. 6b, retaining means 56 may be an annular locking spring.

The particular application of the brush seal shown in FIGS. 6a and 6b is at a location in an engine commonly called the compressor discharge seal. The embodiment shown in FIGS. 6a and 6b is meant only to be a schematic representation of typical engine structures and the invention is not limited to that embodiment. That is, the present invention can find application in gas turbine engines at any location where labyrinth seals are presently used. Because of the flexibility of the bristles used in the seal, the seal has particular advantage in a gas turbine engine application due to the seal's tolerance of thermal transients created by acceleration and deceleration of the engine. That is, during a deceleration of the engine, when the compressor casing is cooling faster than the rotor against which the bristles make sealing contact, the compressor casing and bristle ends will be moved radially inwardly. Because the bristles are flexible, they will be splayed apart while retaining a sealing contact with a sealing surface such as surface 47 and will not create grooves that will later cause losses of efficiency. Generally, it would be desirable to utilize such seals between relatively movable members wherein the pressure drop is greater than 50 psi.

It will be understood that the previous discussions are based upon using the furthest upstream seal stage as a baseline for comparison with subsequent downstream seal stages. Thus, the discussion was set forth in terms of increasing the effective flow area of the seal stages in an upstream to downstream direction. The furthermost downstream seal stage could have been used as a baseline, however, in which case the discussion would have related to decreasing the effective flow area across the seal from the downstream to the upstream direction. Also, it will be understood that depending upon the particular application, gas turbine engines included, that it may be desirable to affect a change in the effective flow area of a seal stage in one or more positive senses— such as by decreasing the bristle packing of a stage— while also affecting it in one or more negative senses— such as by decreasing the bristle diameter— to achieve the desired effective flow area for a particular stage so as to obtain the pressure drop sought. Thus, the present invention contemplates varying the seal stage structures in the manners described herein in both positive and negative senses so as to achieve the desired effective flow area for each seal stage.

While the present invention has been described with a particular usage in mind, namely a gas turbine engine and at a particular location in the engine, namely, the compressor discharge seal, it would have application additionally to any structure wherein it is necessary to seal a high pressure upstream region from a low pressure downstream region wherein the seal is located between two seal members, which may be relatively movable.

Having thus described the present invention, additional numerous changes, substitutions, modifications and alterations may suggest themselves to those skilled in the art, all of which fall within the spirit and scope of the present invention. Accordingly, it is intended that the invention be limited only by the scope of the appended claims.

We claim:

1. A gas turbine engine of the type including a compressor section, a combustor section, and a turbine section, said engine including a plurality of relatively movable members and at least one brush seal disposed between said members to limit the flow of gas from an upstream high pressure region to a downstream low pressure region, wherein said brush seal is attached to a first one of said members and comprises a plurality of pressure drop stages, each stage of said brush seal including:

an annular backing plate spaced from said second one of said members to define a clearance gap;
an annular facing plate; and
a bristle packing including a plurality of bristles disposed between said plates;

wherein each of said stages of said seal has an effective flow area defined in part by the clearance gap of each said stage, the density of bristle packing of each said stage, the width of each bristle packing of each said stage and the diameter of the bristles of each said bristle packing, and wherein said effective flow area is increased from stage to stage in the direction of air flow from said high pressure to said low pressure region such that said seal has a substantially equal pressure drop across each stage of said seal.

2. The seal of claim 1 wherein said effective flow area of each downstream stage is increased with respect to the nearest upstream stage:

by increasing the clearance gap between said backing plate and said second one of said members in successive stages from said high pressure area to said low pressure area;
by reducing the density of bristle packing in successive stages from said high pressure area to said low pressure area;

by decreasing the width the bristle packing in successive stages from said high pressure area to said low pressure area;

by increasing the diameter of the bristles in each bristle packing in successive stages from said high pressure area to said low pressure area; or by each of said backing plates of said successive stages including a plurality of venting holes, said holes of each of said stages having a total flow through area, said total flow through area increasing in size in successive stages from said high pressure area to said low pressure area.

3. The seal of claim 1 wherein said effective flow are of at least one downstream stage is increased:

by increasing the clearance gap of said backing plate of said at least one downstream stage;

by reducing the density of bristle packing of said at least one downstream stage;

by decreasing the width in successive stages from said high pressure area to said low pressure area;

by increasing the diameter of the bristles in each bristle packing in successive stages from said high pressure area to said low pressure area; or by the backing plate of said at least one downstream stage including a plurality of venting holes.

4. The seal of claim 1 wherein the effective flow area of at least one downstream seal stage is increased:
a. by increasing the clearance gap between said backing plate of said at least one downstream seal stage and said second one of said members; and either
b.
by reducing the density of bristle packing in said stage;
by decreasing the width of said bristle packing in said stage;
by increasing the diameter of bristles in said bristle packing of said stage; or
by said backing plate of said stage including a plurality of venting holes.

5. The seal of claim 1 wherein the effective flow area of at least one downstream seal stage is increased:
a. by reducing the density of bristle packing in said stage;
and either
b.
by decreasing the width of bristle packing in said stage;
by increasing the diameter of the bristles in said bristle packing; or
by said backing plate of said seal stage including a plurality of venting holes.

6. The seal of claim 1 wherein the effective flow area of at least one downstream seal stage is increased:
a. by decreasing the width of bristle packing in said stage;
and either
b.
by increasing the diameter of the bristles in said stage; or
by said backing plate of said stage including a plurality of venting holes.

7. The seal of claim 1 wherein the effective flow area of at least one downstream seal stage is increased
by increasing the diameter of the bristles in each of said bristle packing of said stage; and
by said backing place of said downstream seal stage including a plurality of venting holes.

8. The seal of claim 1 wherein said seal stages are attached to said stationary member and said rotary member includes a sealing surface for contacting said bristles.

9. The seal of claim 8 wherein said stationary member is part of a compressor casing structure and said rotating member is part of a compressor rotor structure.

10. The seal of claim 1 wherein the pressure drop across said seal exceeds the pressure drop capability of a single stage of said brush seal.

11. A brush seal disposed between two members between regions of high and low pressures wherein at least one of said members is movable relative to the other and comprising a plurality of stages, each stage having an effective flow area and including:

a backing plate spaced apart from one of said members to define a clearance gap;

a facing plate; and a bristle packing including a plurality of bristles carried by the other one of said members and disposed between said plates;

wherein said effective flow area of each stage increases from stage to stage in the direction of air flow from high pressure to low pressure such that the pressure drop across each said stage of said seal remains substantially equal.

12. The seal of claim 11 wherein said effective flow area of each stage is defined in part by said clearance gap, by the density of bristle packing, the width of each bristle packing of each said stage, and the diameter of the bristles of each said bristle packing, and wherein said effective flow area of each said stage is increased:

by increasing said clearance gap between said backing plate and said one member in successive stages from said high pressure area to said low pressure area;

by reducing the density of bristle packing in successive stages from said high pressure area to said low pressure area;

by decreasing the width in successive stages from said high pressure area to said low pressure area;

by increasing the diameter of the bristles in each bristle packing in successive stages from said high pressure area to said low pressure area; or by each of said backing plates of said successive stages including a plurality of venting holes, said holes of each of said stages having a total flow through area, said total flow through area increasing in size in successive stages from said high pressure area to said low pressure area.

13. The seal of claim 11 wherein said effective flow area of at least one downstream stage is increased:

by increasing the clearance gap of said backing plate of said at least one downstream stage;

by reducing the density of bristle packing of said at least one downstream stage;

by decreasing the width in successive stages from said high pressure area to said low pressure area;

by increasing the diameter of the bristles in each bristle packing in successive stages from said high pressure area to said low pressure area; or by the backing plate of said at least one downstream stage including a plurality of venting holes.

14. The seal of claim 11 wherein the effective flow area of at least one downstream seal stage is increased:
a. by increasing the clearance gap between said backing plate of said at least one downstream seal stage and said second one of said members;

and either
b.
- by reducing the density of bristle packing in said stage;
- by decreasing the width of said bristle packing in said stage;
- by increasing the diameter of bristles in said bristle packing of said stage; or
- by said backing plate of said stage including a plurality of venting holes.

15. The seal of claim 11 wherein the effective flow area of at least one downstream seal stage is increased:
   a. by reducing the density of bristle packing in said stage;
and either
b.
- by decreasing the width of bristle packing in said stage;
- by increasing the diameter of the bristles in said bristle packing; or
- by said backing plate of said seal stage including a plurality of venting holes.

16. The seal of claim 11 wherein the effective flow area of at least one downstream seal stage is increased:
   a. by decreasing the width of bristle packing in said stage;
and either
b.
- by increasing the diameter of the bristles in said stage; or
- by said backing plate of said stage including a plurality of venting holes.

17. The seal of claim 11 wherein the effective flow area of at least one downstream seal stage is increased
   by increasing the diameter of the bristles in each of said bristle packing of said stage; and
   by said backing place of said downstream seal stage including a plurality of venting holes.

18. A brush seal comprising a plurality of pressure drop stages and having a substantially equal pressure drop across each stage of said brush seal, said brush seal disposed between a rotating member and stationary member and between an upstream high pressure region and a downstream low pressure region, said seal being attached to said stationary member, each of said stages of said seal having an effective flow area and comprising:
   a backing plate spaced apart from said rotating member to define a clearance gap;
   a facing plate; and
   a bristle packing including a plurality of bristles disposed therebetween and sealingly contacting said rotating member;
wherein said effective flow area Of each stage increases from stage to stage in the direction of air flow from said high pressure region to said low pressure region such that the pressure drop across each said stage of said seal remains substantially equal.

19. The seal of claim 18 wherein said effective flow area of each stage is defined in part by the clearance gap of each said stage, by the density of bristle packing of each said stage, the width of each bristle packing of each said stage, and the diameter of the bristles of each said bristle packing, and wherein said effective flow area is increased:
   by increasing said clearance gap between said backing plate and said rotating member in successive stages from said high pressure area to said low pressure area;
   by reducing the density of bristle packing in successive stages from said high pressure area to said low pressure area;
   by decreasing the width in successive stages from said high pressure area to said low pressure area;
   by increasing the diameter of the bristles in each bristle packing in successive stages from said high pressure area to said low pressure area; or
   by each of said backing plates of said successive stages including a plurality of venting holes, said holes of each of said stages having a total flow through area said total flow through area increasing in size in successive stages from said high pressure area to said low pressure area.

20. The seal of claim 18 wherein said effective flow area of at least one downstream stage is increased:
   by increasing the clearance gap between said backing plate of said at least one downstream stage and said rotating member;
   by reducing the density of bristle packing of said at least one downstream stage;
   by decreasing the width in successive stages from said high pressure area to said low pressure area;
   by increasing the diameter of the bristles in each bristle packing in successive stages from said high pressure area to said low pressure area; or
   by the backing plate of said at least one downstream stage including a plurality of venting holes.

21. The seal of claim 18 wherein the effective flow area of at least one downstream seal stage is increased:
   a. by increasing the clearance gap between said backing plate of said at least one downstream stage and said rotating member;
and either
b.
- by reducing the density of bristle packing in said stage;
- by decreasing the width of said bristle packing in said stage;
- by increasing the diameter of bristles in said bristle packing of said stage; or
- by said backing plate of said stage including a plurality of venting holes.

22. The seal of claim 18 wherein the effective flow area of at least one downstream seal stage is increased:
   a. by decreasing the density of bristle packing in said stage;
either
b.
- by decreasing the width of bristle packing in said stage;
- by increasing the diameter of the bristles in said bristle packing; or
- by said backing plate of said seal stage including a plurality of venting holes.

23. The seal of claim 18 wherein the effective flow area of at least one downstream seal stage is increased:
   a. by decreasing the width of bristle packing in said stage;
and either
b.
- by increasing the diameter of the bristles in said stage; or
- by said backing plate of said stage including a plurality of venting holes.

24. The seal of claim 18 wherein the effective flow area of at least one downstream seal stage is increased
   by increasing the diameter of the bristles in each of said bristle packing of said stage; and
   by said backing plate of said downstream seal stage including a plurality of venting holes.

25. A brush seal comprising a plurality of pressure reduction stations disposed within a gas flow from an upstream high pressure region to a downstream low pressure region, each of said stations having an effective flow area defining in part a pressure drop across each said station, wherein the effective flow area across a downstream station is relatively greater than the effective flow area across an adjacent upstream region such that effective flow area across an adjacent upstream region such that the pressure drop across said adjacent upstream and downstream station is substantially equal.

26. The brush seal of claim 25 wherein said brush seal is disposed between relatively movable members.

27. The brush seal comprising a plurality of pressure reduction stations disposed within a gas flow from an upstream high pressure region to a downstream low pressure region, each of said stations having an effective flow area defining in part a pressure drop across each said station, said seal having a controlled distribution of pressure drops across said stations, wherein said controlled distribution of pressure drops is accomplished by varying the effective flow area of said stations.

28. The brush seal of claim 27 wherein said brush seal is disposed between relatively movable members.

29. A method for equalizing the pressure drops across the individual stages of a multiple stage brush seal disposed between a rotating member and stationary member and between an upstream high pressure region and a downstream low pressure region, said seal being attached to said stationary member and comprising a plurality of pressure drop stages, each of said stages of said seal having an effective flow area and comprising:
   a backing plate spaced apart from said rotating member to define a clearance gap;
   a facing plate; and
   a bristle packing including a plurality of bristles disposed therebetween and sealingly contacting said rotating member;
said method comprising:
   increasing said effective flow area of each said stage from stage to stage in the direction of air flow from said high pressure region to said low pressure region such that the pressure drop across each said stage of said seal remains substantially equal.

30. The method of claim 29 wherein said effective flow area of each stage is defined in part by the clearance gap of each said stage, by the diameter of the bristles in each said bristle packing, by the width of each said bristle packing, and by the density of bristle packing of each said stage, and wherein said effective flow area of each said state is increased:
   by increasing said clearance gap between said backing plate and said rotating member in successive stages from said high pressure area to said low pressure area;
   by reducing the density of bristle packing in successive stages from said high pressure area to said low pressure area;
   by decreasing the width the bristle packing in successive stages from said high pressure area to said low pressure area;
   by increasing the diameter of the bristles in each bristle packing in successive stages from said high pressure area to said low pressure area; or
   by each of said backing plates of said successive stages including a plurality of venting holes, said holes of each of said stage having a total flow through area said total flow through area increasing in size in successive stages from said high pressure area to said low pressure area.

31. The method of claim 29 wherein said effective flow area of at least one downstream stage is increased:
   by increasing the clearance gap between said backing plate of said at least one downstream stage and said rotating member;
   by reducing the density of bristle packing of said at least one downstream stage;
   by decreasing the width the bristle packing in successive stages from said high pressure area to said low pressure area;
   by increasing the diameter of the bristles in each bristle packing in successive stages from said high pressure area to said low pressure area; or
   by the backing plate of said at least one downstream stage including a plurality of venting holes.

32. The method of claim 29 wherein the effective flow area of at least one downstream seal stage is increased:
   a. by increasing the clearance gap between said backing plate of said at least one downstream stage and said rotating member;
   and either
   b.
      by reducing the density of bristle packing in said stage;
      by decreasing the width of said bristle packing in said stage;
      by increasing the diameter of bristles in said bristle packing of said stage; or
      by said backing plate of said stage including a plurality of venting holes.

33. The method of claim 29 wherein the effective flow area of at least one downstream seal stage is increased:
   a. by reducing the density of bristle packing in said stage;
   and either
   b.
      by decreasing the width of bristle packing in said stage;
      by increasing the diameter of the bristles in said bristle packing; or
      by said backing plate of said seal stage including a plurality of venting holes.

34. The method of claim 29 wherein the effective flow area of at least one downstream seal stage is increased:
   a. by decreasing the width of bristle packing in said stage;
   and either
   b.
      by increasing the diameter of the bristles in said stage; or
      by said backing plate of said stage including a plurality of venting holes.

35. The method of claim 29 wherein the effective flow area of at least one downstream seal stage is increased
   by increasing the diameter of the bristles in each of said bristle packing of said stage; and
   by said backing place of said downstream seal stage including a plurality of venting holes.

* * * * *